Figure 1:
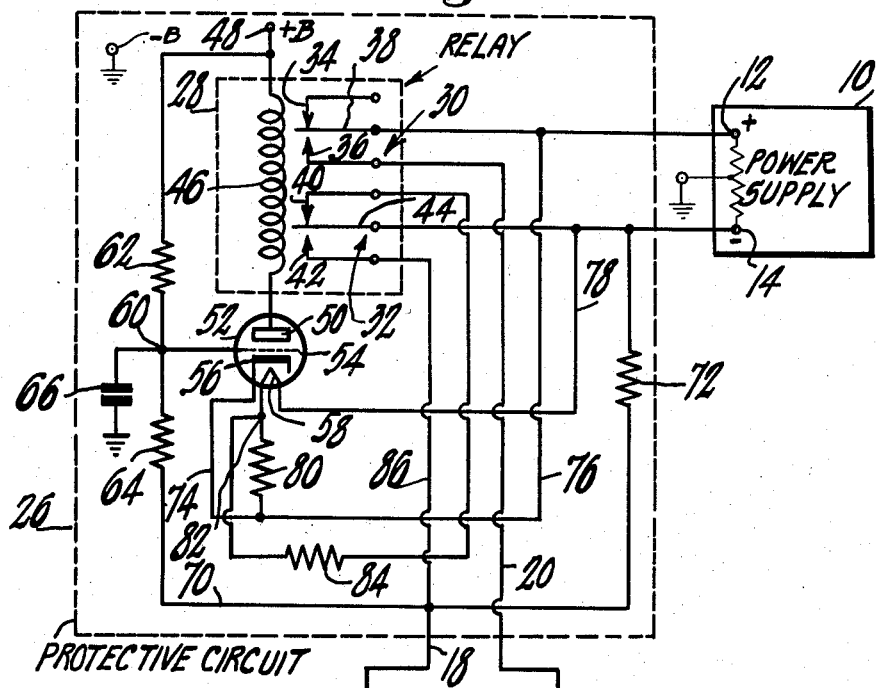
Figure 1:
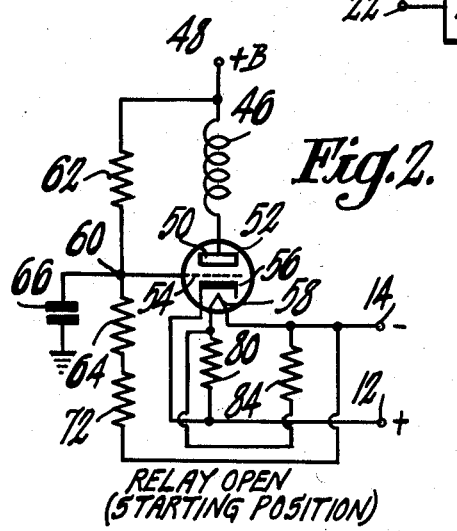
Figure 1:
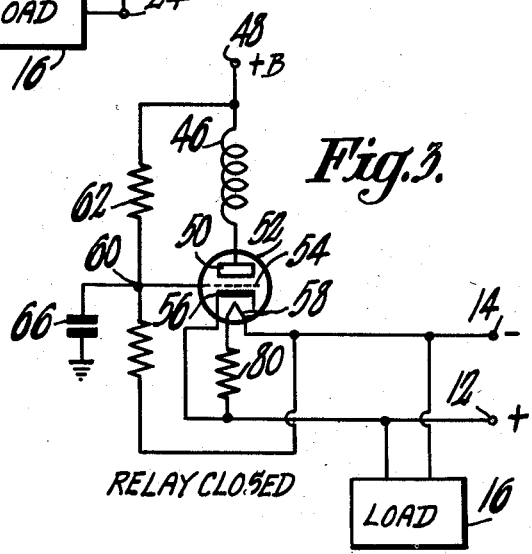

July 8, 1958 W. L. HURFORD ET AL 2,842,719
ELECTRICAL PROTECTIVE APPARATUS
Filed Oct. 18, 1954

INVENTORS
WINSLOW L. HURFORD
& WILLIAM J. NEELY
BY
ATTORNEY

United States Patent Office 2,842,719
Patented July 8, 1958

2,842,719
ELECTRICAL PROTECTIVE APPARATUS

Winslow L. Hurford, Collingswood, and William J. Neely, Oaklyn, N. J., assignors to Radio Corporation of America, a corporation of Delaware Application October 18, 1954, Serial No. 426,956

The terminal fifteen years of the term of the patent to be granted has been disclaimed 11 Claims. (Cl. 317—23)

The present invention relates to new and improved electrical protective apparatus and, more particularly, to apparatus capable of automatically preventing the application of energy beyond a predetermined "safe" value to an electrical load.

While the invention will be described herein as it may be advantageously applied to protecting electron tube filaments which are energized from a direct current power supply against over-voltage conditions, it will be recognized that its principles are applicable to other environments in which it is necessary or desirable to limit the application of voltage to a load circuit.

It is a primary object of the present invention to provide novel means for preventing the application of electrical energy beyond a preselected value to a load.

Another and more specific object of the invention is that of providing novel circuit means for automatically disconnecting a load from its source of electrical energy upon the occurrence of an electrical condition which might render unsafe the continued application of energy from source to load.

By reason of the fact that electron tube circuits are rather delicate in nature, excessive voltages are capable of causing irreparable and often costly damage. There have, therefore, been many proposals in the past for electrical protective circuits which operate in a variety of manners to effect disconnection of a power supply from its load in the event of equipment failure, over-voltage and the like. Most prior art proposals have, however, been "single-action" in nature, that is, capable of effecting the necessary de-coupling of power supply and load under unsafe conditions but incapable of recoupling the supply and load upon the return to safe operating conditions. Where the supply and load are physically located in proximity to each other, the operator of the equipment may simply effect the recoupling as through the agency of a manual "reset" switch. When, on the other hand, the supply and its load are located at a distance from each other or when no operator is in attendance, the problem of returning the equipment to operation is one of great moment.

Hence it is a further object of the present invention to provide novel protective circuit means capable of automatically decoupling a power supply and load under unsafe operating conditions and for automatically recoupling such supply and load upon the return to safe operating conditions.

In general, the present invention contemplates the realization of the foregoing and other objects through the provision of an electron tube circuit whose conductivity controls the action of relay means which, in turn, serve to make an electrical connection between a power supply or other energy source and its load. Bias means for said electron tube circuit determine whether it is to be conductive or non-conductive in accordance with the condition of the power supply under load. Normally, according to one form of the invention, such means are provided for maintaining the electron tube in a conductive state so that the relay means are operative to provide a current path between supply and load. Upon the occurrence of an unsafe condition (e. g., over-voltage) to which the bias means are responsive, the tube is rendered non-conductive, thereby actuating the relay means in a manner to disconnect the load from its supply. A charging circuit in the bias arrangement serves to return the tube to its conductive state after a short time delay, thereby permitting the resampling of the voltage conditions under load. When such resampling detects that the unsafe condition no longer obtains, the electron tube is permitted to remain conductive, thereby insuring the safe flow of energy between supply and load. As will appear more fully hereinafter, the present invention is advantageous in that it serves as an automatic recycling arrangement as set forth briefly above and, moreover, "fails safe" for all improper or dangerous operating conditions.

Additional objects and advantages of the present invention will become apparent to persons skilled in the art from a study of the following detailed description of the accompanying drawing, in which:

Fig. 1 is a schematic circuit diagram illustrative of an embodiment of the present invention; and Figs. 2 and 3 are, respectively, equivalent circuit diagrams of the circuitry of Fig. 1 for different conditions of its operation.

Referring to the drawing and, particularly, to Fig. 1 thereof, a direct current power supply 10 having positive and negative output terminals 12 and 14, respectively, is adapted to be connected electrically to a load circuit 16 in such manner as to energize the load with direct current voltage of a predetermined level. The load circuit 16 may, by way of illustration, comprise one or more electron tube filaments and may be located at a substantial distance from the power supply 10, so that it will be understood that the leads 18 and 20 connected respectively to the load terminals 22 and 24 can be in the form of a length of cable, for example, stretched between different floors of a building or between any two other remote points. In such an environment it will be appreciated that where no operator is in attendance or where an operator is present only at the location of the load, any protective circuit which operates to disconnect the load 16 from its power supply 10 in the event of over-voltage should also be capable of automatically reconnecting the load and supply once the unsafe condition has been eliminated. The present invention provides such means in the form of the circuitry contained within the dotted line rectangle 26.

Those elements of the protective circuit 26 which serve actually to make and break the electrical connections between the power supply 10 and load 16 are illustrated diagrammatically within the relay box 28. Specifically, each of the relays 30 and 32 comprises a pair of stationary contact members and a movable member. That is, the relay 30 includes upper and lower stationary contacts 34 and 36 and a movable member 38 adapted to make connection with either one of the stationary elements. Similarly, the relay 32 includes upper and lower contact elements 40 and 42 and a movable member 44. The two movable members 38 and 44 of the relays are normally in their uppermost position (i. e. as shown in Fig. 1) and remain in that position until they are moved downwardly by the magnetic action of a relay coil 46.

The coil 46 is connected between a source of positive potential indicated as "+B" at the terminal 48 and the anode 50 of an electron tube 52 which further includes a control electrode 54, a cathode 56 and a filament 58. The control electrode 54 of the tube 52 is connected to the junction 60 of resistors 62 and 64 and a capacitor 66. The end of the resistor 62 remote from the junction 60 is connected to the terminal 48, while the end of the resistor 64 remote from that junction is connected via a lead 70 and a resistor 72 to the negative voltage terminal 14 of the power supply 10. The cathode 56 of the control tube is connected via leads 74 and 76 to the positive terminal 12 of the supply. The filament winding 58 of the tube 52 is connected at one end through a lead 78 to the power supply terminal 14 and at its other end to one terminal of a current-limiting resistor 80 whose other terminal is connected to the junction 82 between the leads 74 and 76. Finally with regard to the circuitry associated with the control tube 52, it will be noted that an additional current-limiting resistor 84 is connected between the junction 82 and the upper stationary contact 40 of the relay 32.

Insofar as the relays themselves are concerned, it is to be noted that the lower contact element 36 of the relay 30 is connected to the lead 20 while the movable member 38 is connected directly to the positive terminal 12 of the power supply. The lower stationary contact 42 of the relay 32 is connected via a lead 86 to the lead 18, while the movable member 44 is connected directly to the negative terminal 14 of the power supply.

The operation of the apparatus of Fig. 1 may, perhaps, be more readily understood from the simplified showings of Figs. 2 and 3. The first stage of the operation will be understood as being that in which the power supply 10 has just been connected to the circuit 26. Since the relays 30 and 32 are then in their "open" positions (i. e. as shown in Fig. 1), the equivalent showing of the apparatus will be as indicated in Fig. 2. The source voltage across the terminals 12 and 14 is applied to the control tube filament 58 through the series current limiting resistor 80 and the filament current is further limited during the warm-up period of the tube by means of the shunt resistor 84. As the filament 58 becomes heated, the control electrode 54 of the control tube 52 will be brought to a potential which is determined by the division of voltage between the resistors 62, 64 and 72, which potential may be chosen to be substantially that of the cathode 56. The capacitor 66 will, as a result, become charged to the potential existing at the junction 60 in the voltage division network. By reason of the described biasing of the control electrode 54 with respect to the cathode 56, the tube 52 will conduct heavily through the relay coil 46, thereby moving the relay members 38 and 42 to their lower positions (hereinafter termed their "closed" positions) with the result that the equivalent circuit will be as shown in Fig. 3. Closing of the relays 30 and 32 serves to connect the supply 10 to the load 16 in the following manner (Fig. 1): the positive terminal 12 of the power supply may be traced through the movable relay member 38 and the stationary contact 36 of the relay 30 to the lead 20. Similarly, the negative voltage terminal 14 may be traced through the movable terminal 44, stationary contact 46 and lead 86 to the lead 18. With the relays closed, the shunt resistor 84 in circuit with the filament 58 is effectively removed from the circuit, since it has served its purpose of limiting the filament current initially during tube warm-up. Of greater significance, however, is the fact that closing of the relay 32 results in the placing of an effective short circuit across the resistor 72, so that the control electrode 54 is at a potential determined by the division of voltage between only the resistors 62 and 64, which potential is less positive than that which obtained in the condition of Fig. 2. In the condition of the circuit shown in Fig. 3, it will be understood that the capacitor 66 is discharged to the less positive potential existing at the terminal 60.

By virtue of the fact that, in Fig. 3, the power supply terminals 12 and 14 are effectively connected to the load 16, the supply voltage at those terminals will be lowered from their no-load values. This fact, coupled with the lower potential at which the control electrode 54 is returned sets the degree of conduction of the tube 52 at such value as to maintain the current in the relay coil 46 sufficient to hold the relays in their closed positions and further places the operating point of the tube 52 where it is extremely sensitive to changes in its bias potentials (viz. as determined by changes in the voltage applied to the load 16).

Assuming next that some portion of the load 16 between the terminals 22 and 24 is removed or that an increase in the supply voltage at the source terminals 12 and 14 results in raising the load voltage beyond a predetermined maximum or safe value, the following events will take place: the control electrode 54 will be brought to a less positive potential (i. e. more negative) by reason of the more negative potential at the terminal 14, and the cathode 56 will be returned to a more positive potential by reason of a more positive potential at the terminal 12. These two potential changes are sufficient to bring about such a bias increase in the tube 52 as to reduce the anode current in that tube below the value necessary for maintaining the relays in their closed position. The movable contacts 38 and 42 of the relays will, therefore, return to their upper positions, thereby returning the protective circuit to the condition shown by the equivalent diagram of Fig. 2 wherein the voltage supply terminals 12 and 14 are disconnected from the load. In this manner, the protective circuit 26 of the present invention serves to prevent the application of an excessive voltage between the power supply and its load. In accordance with the invention, however, the circuitry within block 26 is further operative as automatic resampling means for reconnecting the power supply to its load once the unsafe conditions cease to obtain. The manner in which this latter action is realized will now be described.

As has been stated, the voltage condition which caused the control tube 52 to return to its non-conductive state also resulted in the opening of the relays 30 and 32, thereby placing the circuit in its condition shown in Fig. 2. The opening of the relays removes the short circuit from across the bleeder resistor 72, so that the control electrode 54 of the tube is brought to a more positive potential at a rate determined by the time constant of the circuit including the capacitor 66 and the resistors 62, 64 and 72 to a potential determined by the value of +B and the negative potential at terminal 14 as divided by those resistors. When the capacitor 66 has charged to its new, more positive potential, the tube 52 will conduct heavily through the relay coil 46, thereby closing the relays 30 and 32 once again. Concurrently with the closing of the relay 32, the resistor 72 is again short-circuited, leaving only the resistors 62 and 64 to divide the voltage between the terminals 48 and 14. The capacitor 66 then discharges and, assuming that the voltage under load is within a "safe" range (i. e. below the preselected maximum value), the relays 30 and 32 will remain closed, thus permitting continued voltage application from the supply to the load. Assuming, on the other hand, that when the capacitor 66 has discharged the load voltage is still outside the safe range, the tube 52 will again be cut off, causing the relays to open and to disconnect the supply from the load. The circuit 26 will continue to resample the voltage under load in the manner described until such time as the voltage under load falls within the safe range, whereupon the relays 30 and 32 will remain closed with the circuit in the condition of Fig. 3.

It will be apparent from an examination of Fig. 1 that the apparatus of the present invention necessarily "fails safe" (i. e. with the load disconnected from the power supply in the event of abnormal operating conditions other than the above-described over-voltage condition). For example, failure of the +B supply connected to the terminal 48 will cause the tube 52 to be cut off, thereby opening the relays. Similarly, failure of the tube 52, as through an open filament or the like, will also result in the de-energization of the relays.

While the invention has been described in accordance with a specific embodiment in which a load is supplied with energy from a power supply having terminals which are respectively positive and negative with respect to ground, it should be understood that the voltage may be positive only or negative only without appreciably altering the operation of the apparatus. That is to say, either of the terminals 12 and 14 might be at ground potential rather than "floating" as described herein.

Further in this vein, it may be noted that if the impedance from the negative supply terminal 14 to ground is small compared to the value of the resistor 72, the return potential for the resistor 64 is substantially ground potential. In this latter event, the sampling action or recycling which is produced in accordance with the invention will be realized as described except for the fact that the charging rate of the capacitor 66 will be changed by reason of the difference in the resistive value of the time constant network. Even where the impedance from the terminal 14 to ground is quite low, it will be understood, when the load is disconnected through the protective action of the circuit, the resistor 72 will be reinserted into the circuit (as shown in Fig. 2) so that the sampling process will be carried out in the manner set forth supra.

From the foregoing it will be recognized that the present invention provides a circuit requiring only a single electron tube associated with relatively simple and inexpensive components, which circuit serves automatically to disconnect a load from its power supply under unsafe conditions and, moreover, to resample the conditions under load periodically whereby to reconnect the load to its supply once the unsafe conditions have been eliminated.

Having thus described our invention, what we claim as new and desire to secure by Letters Patent is:

1. Protective apparatus for automatically disconnecting a source of electrical energy from a load under predetermined conditions, which apparatus comprises: means including switch means connected between such source and such load for defining a current path therebetween: electron tube means operatively connected to said switch means for causing said switch means selectively to open or complete said current path, depending upon the conductivity of said tube means; means coupled to said electron tube and to such source for controlling the conductivity of said tube in accordance with the level of energy supplied by such source under load conditions and in such manner as to change the conduction of said tube in the direction of opening said current path when such energy level departs from a preselected level; and means in circuit with said last-named means for causing the conductivity of said tube to revert, after a predetermined time interval, to its state in which said current path is completed by said switch means, whereby to sample such energy level under load.

2. Protective apparatus for automatically disconnecting a source of electrical energy from a load under predetermined conditions, which apparatus comprises: means including switch means connected between such source and such load for defining a current path therebetween: electron tube means operatively connected to said switch means for causing said switch means selectively to open or complete said current path, depending upon the conductivity of said tube means; means coupled to said electron tube and to such source for controlling the conductivity of said tube in accordance with the level of energy supplied by such source under load conditions and in such manner as to change the conduction of said tube in the direction of opening said current path when such energy level departs from a preselected level; and means operatively connected to and controlled by said switch means for causing the conductivity of said tube to revert, after a predetermined time interval, to its state in which said current path is completed by said switch means, whereby to sample such energy level under load.

3. Protective apparatus for automatically disconnecting a source of electrical energy from a load under predetermined conditions, which apparatus comprises: means including switch means connected between such source and such load for defining a current path therebetween: electron tube means operatively connected to said switch means for causing said switch means selectively to open or complete said current path, depending upon the conductivity of said tube means; biasing means coupled to said electron tube and to such source for controlling the conductivity of said tube in accordance with the level of energy supplied by such source under load conditions and in such manner as to change the conduction of said tube in the direction of opening said current path when such energy level departs from a preselected level; and auxiliary bias means in circuit with said last-named means for periodically causing the conductivity of said tube to revert to its state in which said switch means complete said current path, whereby to resample such energy level under load.

4. Protective apparatus for automatically disconnecting a source of electrical energy from a load under predetermined conditions, which apparatus comprises: means including switch means connected between such source and such load for defining a current path therebetween: electron tube means operatively connected to said switch means for causing said switch means selectively to open or complete said current path; bias means coupled to said electron tube and to such source for controlling the conductivity of said tube in accordance with the level of energy supplied by such source under load conditions and in such manner as to change the conduction of said tube in the direction of opening said current path when such energy level exceeds a preselected level; said switch means having means for inserting auxiliary bias means in circuit with said first-named bias means for causing the conductivity of said tube to revert, after a predetermined time interval, to its state in which said current path is completed by said switch means, whereby to resample such energy level under load.

5. Electrical protective apparatus for preventing the application of energy from an electrical power supply to a load under predetermined conditions, which apparatus comprises: switch means having open and closed positions and connected between such supply and such load in such manner as to define a current path therebetween in said closed position; an electron tube operatively connected to said switch means in such manner that the conductivity of said tube determines the opening and closing of said switch means, said electron tube having a conduction-controlling electrode; circuit means coupled to said power supply and to said electrode for biasing said tube into that state of conductivity necessary for closing said switch means, said circuit means including means for varying the biasing of said tube in response to a given change in such power supply energy so as to cause the conductivity of said tube to change in the direction of opening said switch means; and means controlled by said switch means in said open position for placing an auxiliary bias on said tube of such value as to cause the conductivity of said tube to revert to its switch-closing state after a predetermined time interval.

6. Electrical protective apparatus for preventing the application of energy from an electrical power supply to a load under predetermined conditions, which apparatus comprises: switch means having open and closed positions and connected between such supply and such load in such manner as to define a current path therebetween in said closed position; an electron tube operatively connected to said switch means in such manner that the conductivity of said tube determines the opening and closing of said switch means, said electron tube having a conduction-controlling electrode; circuit means coupled to said power supply and to said electrode for biasing said tube into that state of conductivity necessary for closing said switch means, said circuit means including means for varying the biasing of said tube in response to a given change in such power supply energy so as to cause the conductivity of said tube to change in the direction of opening said switch means; and means controlled by said switch means in said open position for altering said biasing circuit means for placing an auxiliary bias on said tube of such value as to cause the conductivity of said tube to revert to its switch-closing state after a predetermined time interval.

7. Electrical protective apparatus for preventing the application of energy from an electrical power supply to a load under predetermined conditions, which apparatus comprises: switch means having open and closed positions and connected between such supply and such load in such manner as to define a current path therebetween in said closed position; an electron tube operatively connected to said switch means in such manner that the conductivity of said tube determines the opening and closing of said switch means, said electron tube having a conduction controlling electrode; circuit means coupled to said power supply and to said electrode for biasing said tube into that state of conductivity necessary for closing said switch means, said circuit means including means for varying the biasing of said tube in response to a given change in such power supply energy so as to cause the conductivity of said tube to change in the direction of opening said switch means; and means including a charging circuit controlled by said switch means in said open position for placing an auxiliary bias on said tube of such value as to cause the conductivity of said tube to revert to its switch-closing state after a time interval determined by the time constant of said charging circuit.

8. Electrical protective apparatus for preventing the application of energy from a voltage power supply to a load when the voltage furnished by such supply under load departs from a selected level, said apparatus comprising: switch means having first and second positions and connected between such supply and load so as to define a current path therebetween in said first position and an open circuit therebetween in said second position; switch-operating means including an electron tube having a conduction controlling electrode and coupled to said switch means in such manner that a certain amount of conduction of said tube is necessary for maintaining said switch means in said first position; circuit means coupled to said electrode and to such supply for decreasing the conductivity of said tube below said certain amount in response to a departure of said power supply voltage from a selected level, whereby to place said switch means in said second position; and means in circuit with said circuit means and controlled by said switch means in said second position for increasing the conductivity of said tube to at least said certain amount, thereby causing said switch means to revert, after a predetermined time interval, to said first position wherein the conductivity of said tube is again responsive to the level of said power supply voltage.

9. Electrical protective apparatus for preventing the application of energy from a voltage power supply to a load when the voltage furnished by such supply under load departs from a selected level, said apparatus comprising: switch means having first and second positions and connected between such supply and load so as to define a current path therebetween in said first position and an open circuit therebetween in said second position; switch-operating means including an electron tube having a conduction controlling electrode and coupled to said switch means in such manner that a certain amount of conduction of said tube is necessary for maintaining said switch means in said first position; voltage-dividing circuit means having a given divisor and coupled to said electrode and such supply for decreasing the conductivity of said tube below said certain amount in response to a departure of said power supply voltage from a selected level, whereby to place said switch means in said second position; and means in circuit with said voltage dividing circuit means and controlled by said switch means in said second position altering said divisor so as to increase the conductivity of said tube to at least said certain amount, thereby causing said switch means to revert to said certain amount, thereby causing said switch means to revert to said first position wherein the conductivity of said tube is again responsive to the level of said power supply voltage.

10. Electrical protective apparatus for preventing the application of energy from a voltage power supply to a load when the voltage furnished by such supply under load departs from a selected level, said apparatus comprising: switch means having first and second positions and connected between such supply and load so as to define a current path therebetween in said first position and an open circuit therebetween in said second position; switch-operating means including an electron tube having a conduction controlling electrode and coupled to said switch means in such manner that a certain amount of conduction of said tube is necessary for maintaining said switch means in said first position; a resistive voltage-dividing network connected between a point of fixed potential and such source and having an intermediate point connected to said electrode such that the conductivity of said tube is decreased below said certain amount in response to a departure of said power supply from a selected level, whereby to place said switch means in said second position; and means in circuit with and controlled by said switch means in said second position for altering the division ratio of said network in such sense as to increase the conductivity of said tube to at least said certain amount, thereby causing said switch means to revert to said first position wherein the conductivity of said tube is again responsive to the level of said power supply voltage.

11. Electrical protective apparatus for preventing the application of energy from a voltage power supply to a load when the voltage furnished by such supply under load departs from a selected level, said apparatus comprising: switch means having first and second positions and connected between such supply and load so as to define a current path therebetween in said first position and an open circuit therebetween in said second position; switch-operating means including an electron tube having a conduction controlling electrode and coupled to said switch means in such manner that a certain amount of conduction of said tube is necessary for maintaining said switch means in said first position; voltage-dividing circuit means including a capacitor coupled to said electrode and supply for decreasing the conductivity of said tube below said certain amount in response to a departure of said power supply voltage from a selected level, whereby to place said switch means in said second position; and means operatively connected to and controlled by said switch means in said second position for charging said capacitor to a potential for increasing the conductivity of said tube to at least said certain amount, thereby causing said switch means to revert, after a time interval determined by the time constant of the charging circuit of said capacitor, to said first position wherein the conductivity of said tube is again responsive to the level of said power supply voltage.

References Cited in the file of this patent

UNITED STATES PATENTS

| Number | Name | Date |
|---|---|---|
| 1,861,929 | Lowry | June 7, 1932 |
| 2,424,298 | Bailey | July 22, 1947 |
| 2,460,860 | Volpigno | Feb. 8, 1949 |
| 2,548,818 | Rambo | Apr. 10, 1951 |
| 2,617,024 | Hart | Nov. 4, 1952 |
| 2,619,525 | Webb | Nov. 25, 1952 |
| 2,654,052 | Mayer | Sept. 29, 1953 |